United States Patent
Doh et al.

(10) Patent No.: US 8,089,910 B2
(45) Date of Patent: Jan. 3, 2012

(54) SENSOR NODE OF WIRELESS SENSOR NETWORKS AND OPERATING METHOD THEREOF

(75) Inventors: Yoonmee Doh, Daejeon (KR); Yao Zhiying, Daejeon (KR); Noseong Park, Daejeon (KR); Sun-Joong Kim, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 448 days.

(21) Appl. No.: 12/516,710

(22) PCT Filed: Dec. 5, 2007

(86) PCT No.: PCT/KR2007/006273
§ 371 (c)(1),
(2), (4) Date: May 28, 2009

(87) PCT Pub. No.: WO2008/069564
PCT Pub. Date: Jun. 12, 2008

(65) Prior Publication Data
US 2010/0074157 A1    Mar. 25, 2010

(30) Foreign Application Priority Data

Dec. 8, 2006 (KR) .................. 10-2006-0124288
Apr. 17, 2007 (KR) .................. 10-2007-0037445

(51) Int. Cl.
*G08C 17/00* (2006.01)
*H04L 12/28* (2006.01)
(52) U.S. Cl. .............. 370/311; 370/338; 340/539.22
(58) Field of Classification Search .......... 370/311, 370/338, 400; 340/539.22
See application file for complete search history.

(56) References Cited

U.S. PATENT DOCUMENTS

| 6,662,099 | B2* | 12/2003 | Knaian et al. | 701/117 |
| 7,496,059 | B2* | 2/2009 | Yoon | 370/311 |
| 7,539,533 | B2* | 5/2009 | Tran | 600/509 |
| 2008/0084304 | A1* | 4/2008 | Yarvis | 340/572.1 |
| 2008/0106403 | A1* | 5/2008 | Voglewede et al. | 340/540 |

FOREIGN PATENT DOCUMENTS

| JP | 2005-64557 A | 3/2005 |
| JP | 2005-208719 A | 8/2005 |
| KR | 1020050073780 A | 7/2005 |
| KR | 1020060058975 A | 6/2006 |
| KR | 1020060070165 A | 6/2006 |

OTHER PUBLICATIONS

Vijay Raghunathan, et al; "Emerging Techniques for Long Lived Wireless Sensor Networks", IEEE Communications Magazine, Apr. 2006, vol. 44, Issue 4, pp. 108-114.
Amit Sinha, et al; "Dynamic Power Management in Wireless Sensor Networks", IEEE Design & Test of Computers, vol. 18, Issue 2, Mar.-Apr. 2001, pp. 62-74.
International Search Report—mailed Mar. 13, 2008; PCT/KR2007/006273.

* cited by examiner

*Primary Examiner* — Brian Nguyen
(74) *Attorney, Agent, or Firm* — Ladas & Parry LLP

(57) ABSTRACT

A sensor node of a wireless sensor network includes a first sensor node module for generating and processing, when it is activated, a first sensing signal to detect occurrence of an event based on the first sensing signal; and a second sensor node module for generating and processing a second sensing signal, when it is activated, to monitor state transition of the event based on the second sensing signal. Further, when the occurrence of the event is detected, the first sensor node module is inactivated and the second sensor node module is activated.

12 Claims, 4 Drawing Sheets

[Fig. 1]
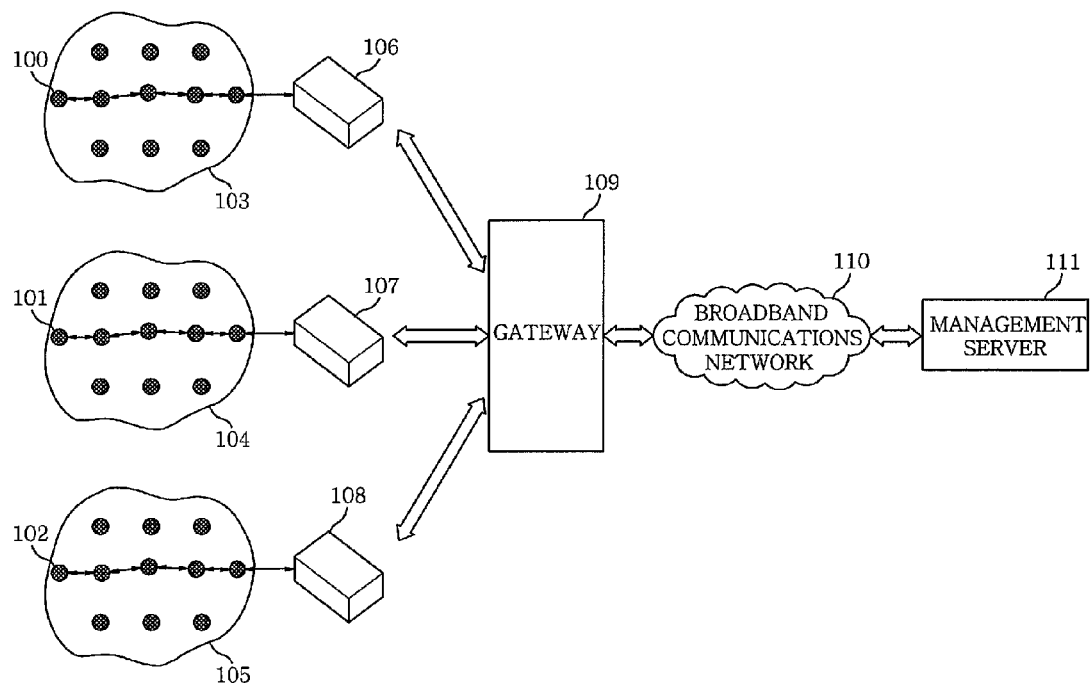
[Fig. 2]
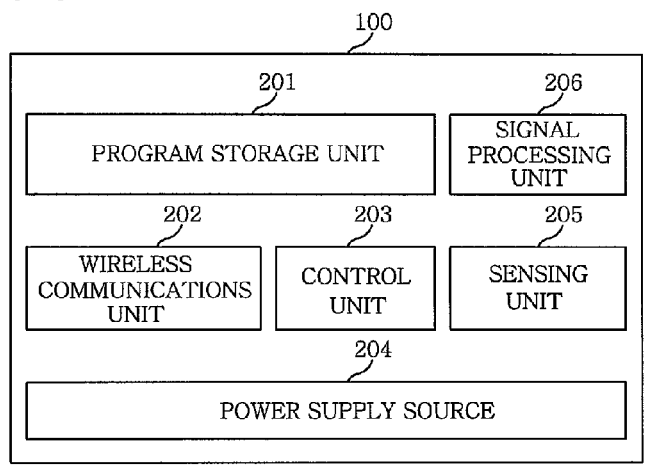

[Fig. 3]
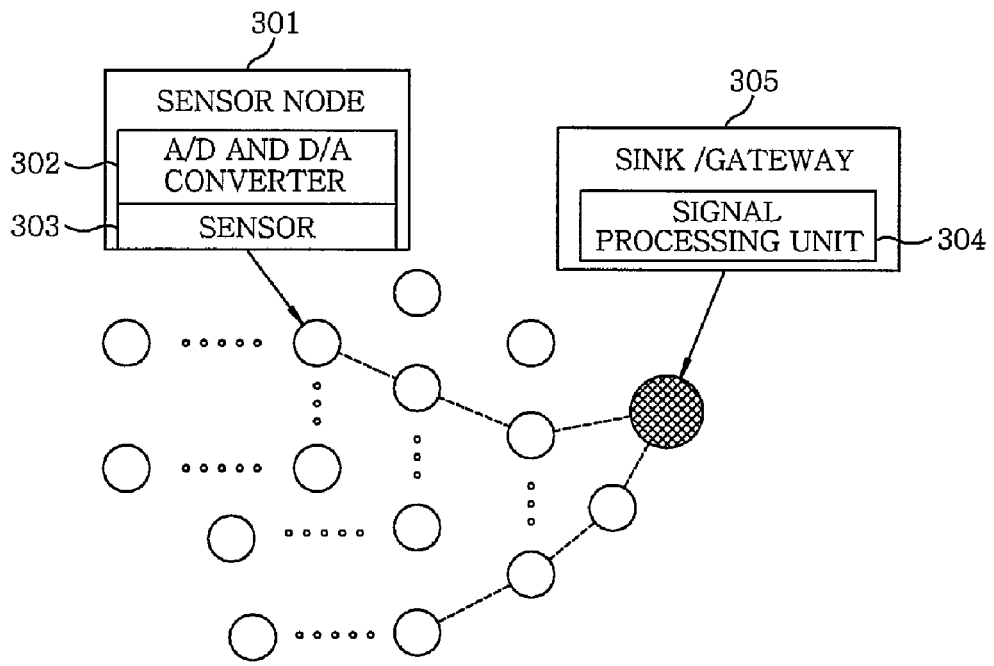
[Fig. 4]
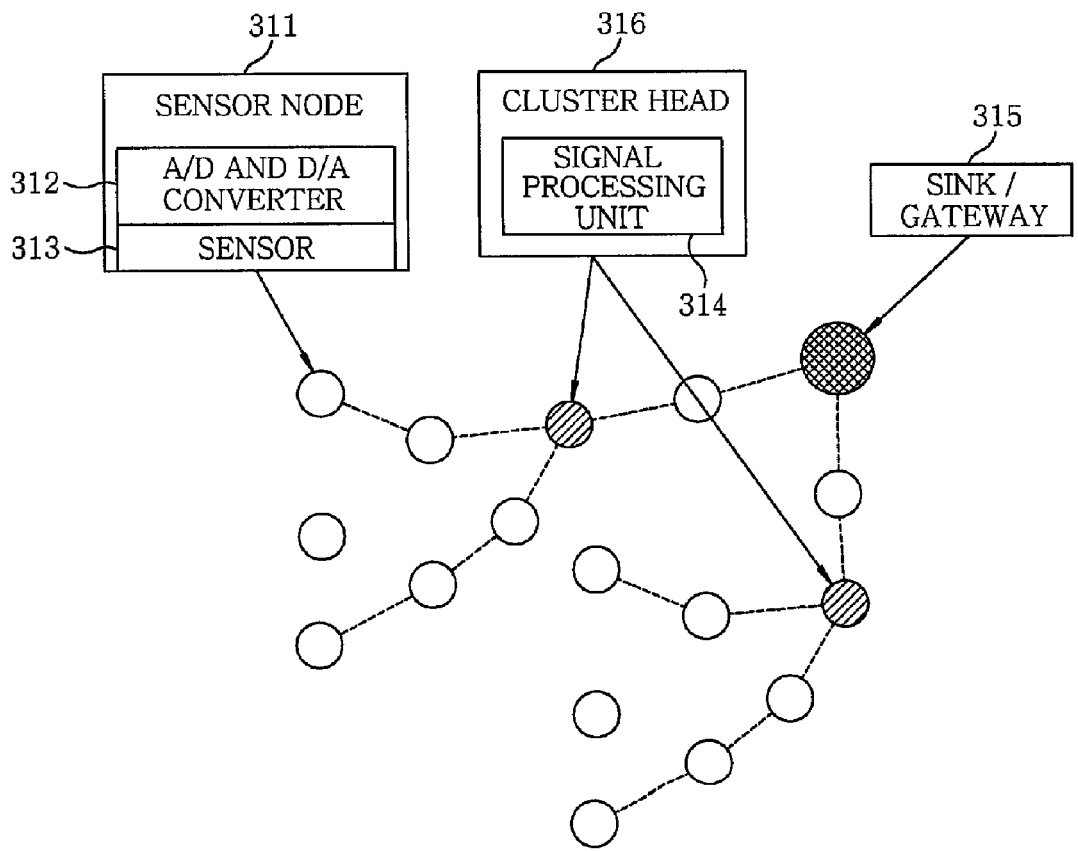

[Fig. 5]
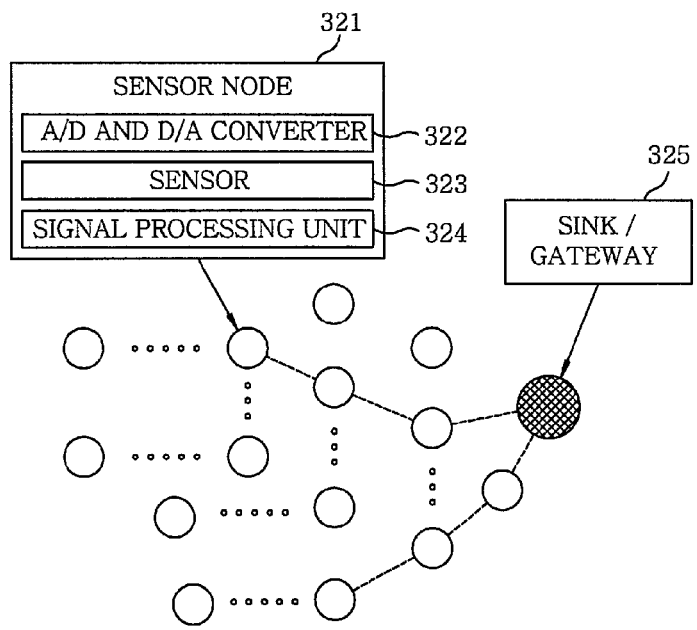
[Fig. 6]
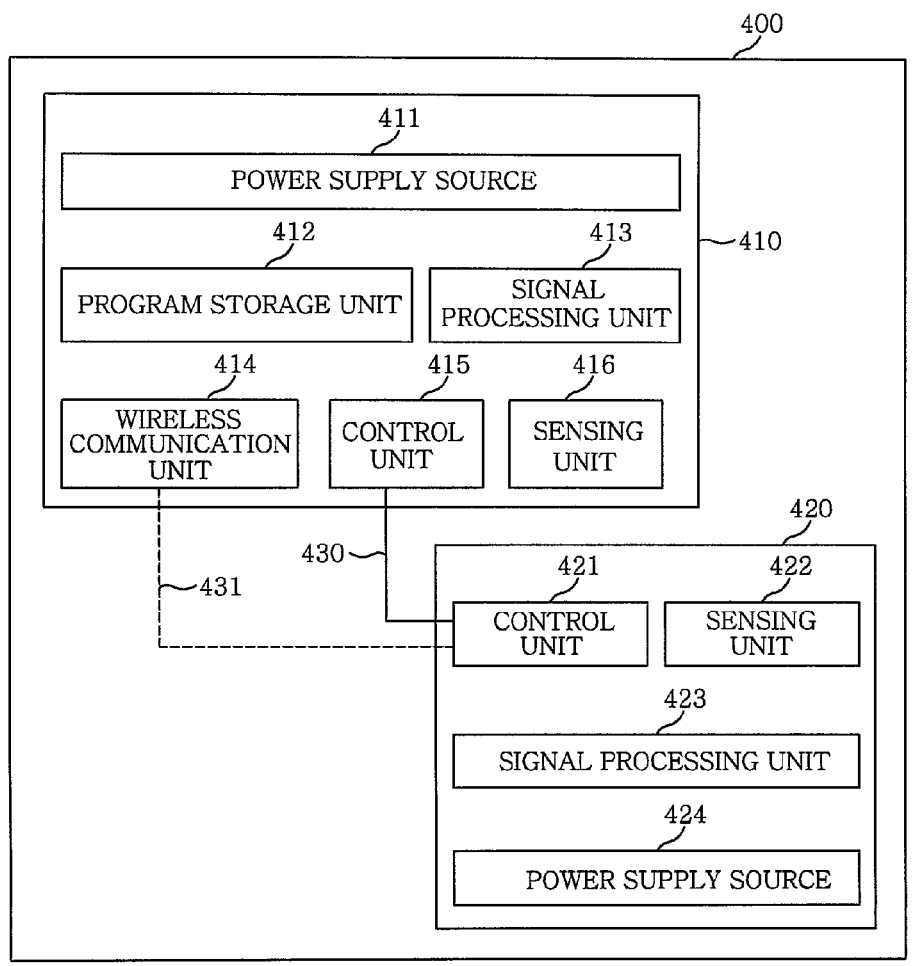

[Fig. 7]
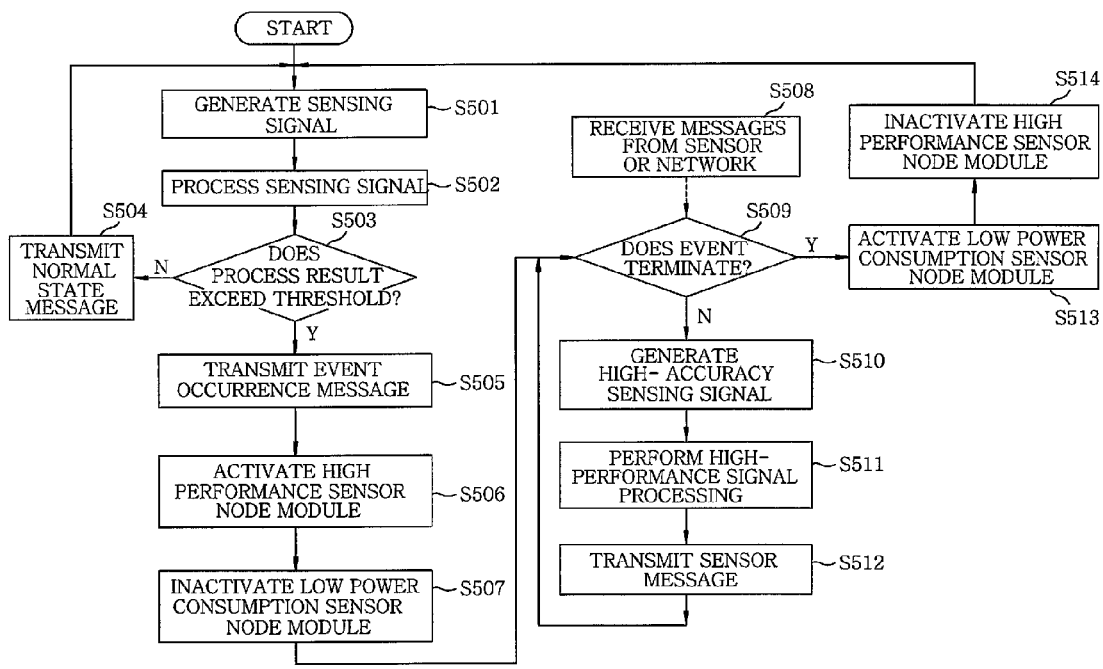

SENSOR NODE OF WIRELESS SENSOR NETWORKS AND OPERATING METHOD THEREOF

TECHNICAL FIELD

The present invention relates to Wireless Sensor Networks (WSN); and, more particularly, to a sensor node of wireless sensor networks and an operating method of the sensor node, the sensor node having a low power consumption sensor node module for detecting occurrence of an event and a high performance sensor node module for monitoring state transition of the event.

BACKGROUND ART

In wireless sensor networks all objects are provided with computing and communications functions to realize an environment where communications with the objects can be made at anytime and anywhere regardless of types of networks, devices and services. A sensor node in the wireless sensor networks obtains sensing information using a sensor and transmits the sensing information to external devices via the network, thus processing and managing the sensing information in real-time.

FIG. 1 illustrates a configuration view of conventional wireless sensor networks.

As shown in FIG. 1, the wireless sensor network includes: sensor fields 103, 104 and 105 respectively formed of sensor nodes 100, 101 and 102, each sensor node having a communications module and a sensor for recognizing objects or monitoring environmental conditions around the sensor; sinks 106, 107 and 108 for receiving sensing information collected in the sensor fields 103, 104 and 105, respectively; and a gateway 109 for routing the sensing information received from the sinks 106, 107 and 108 to transmit the sensing information to a management server 111 via a broadband communications network 110. The sensor nodes 100, 101 and 102 and the sinks 106, 107 and 108 can interoperate with existing infrastructures, such as satellite communications network, wireless LAN, Bluetooth, wired Internet and the like, via the gateway 109.

FIG. 2 illustrates a detailed configuration view of a sensor node shown in FIG. 1. In FIG. 2, among the sensor nodes 100, 101 and 102 of FIG. 1, only one sensor node, e.g., 100, is illustrated for the sake of simple illustration. However descriptions below can be also applicable to the remaining sensor nodes 101 and 102.

As shown in FIG. 2, the sensor node 100 includes: a program storage unit 201 for storing therein operating programs; a wireless communications unit 202; a control unit 203; a power supply source 204, which may be a battery, for supplying driving power to the sensor node 100; a sensing unit 205; and a signal processing unit 206 for processing sensing signals. In general, the sensor node 100 is operated by the limited power of the battery and thus, low power consumption design needs to be preferentially considered when configuring the sensor node 100. Accordingly, the sensor node 100 is generally formed of low power elements, e.g., 8-bit CPU, low power communications elements and peripheral circuits.

In addition to the hardware configuration of the sensor node 100, efficient usage of the limited power of the sensor node 100 is also directly coupled with a lifetime of the sensor network. It is known that the sensor node 100 consumes most of the limited power thereof when transmitting or receiving data via the wireless communications elements. Accordingly, the sensor node 100 periodically performs state transitions between an idle state and an active state. To be specific, operation systems, protocols and the like for use in the sensor network are designed to maintain most of operation time of the sensor node 100 in the idle state and allow the sensor node 100 to obtain sensing information and transmit the sensing information to the management server 111 via the sink 106 during the active state, which is relatively shorter period of time than the idle state. The periodical state transitions between the idle state and the active state corresponds to ON/OFF control of wireless communications elements in the sensor node 100 for transmitting and receiving the data.

As described above, due to the limited power of the sensor node 100, low power consumption elements are preferred as sensor elements for obtaining the sensing information in most applications, and, even a sensor network using the low power consumption sensing elements can sufficiently obtain simple sensing information such as temperature, humidity, illuminance and the like or detect an occurrence of a target event.

However, for example, in order to obtain the sensing information in various indoor and outdoor environments via the sensor network, signal processing through complicated operations, e.g., a fast Fourier transform (FFT), a discrete cosine transform (DCT) and the like, is needed for specific sensing information. In order to perform such signal processing, high power consumption sensing elements having high sensitivity and high performance are needed. But, the high power consumption sensing elements can be employed only when the sensor nodes are main-powered, when the battery basically provides high capacity of power or when the sensing elements in operation can be supplied additional power from an additional power supply source such as solar heat or the like.

In the sensor network, the signal processing for converting the sensing information to data for use in detecting or monitoring environmental conditions can be performed in a system having a power supply source capable of supplying higher capacity of power thereto and higher computing power compared to the sensor node 100, i.e., the signal processing can be performed in the sink 106 or the management server 111. Also, the signal processing can be performed through a distributed-processing in the sensor nodes 100. Below, signal processing methods in the sensor network will be described with reference to FIGS. 3 to 5.

FIG. 3 illustrates a configuration view of a conventional sensor network in which sensing signal processing is performed through a centralized-processing. FIG. 4 illustrates a configuration view of a sensor network in which sensing signal processing is performed through a groupwise distributed-processing. FIG. 5 illustrates a configuration view of a sensor network in which sensing signal processing is performed through a fully distributed-processing. In FIGS. 3 to 5, sensor nodes are distinguished from each other by using different reference numerals 301, 311 and 321, respectively, and sinks/gateways, each of which is formed by integrating a sink and a gateway in a single body, are distinguished from each other by using different reference numerals 305, 315 and 325, respectively.

Total power consumption of the entire sensor network increases in proportion to an increase in the number of information delivery hops and an amount of information. When a sensor node 301 includes an A/D and D/A converter 302 and a sensor 303 and a sink/gateway 305 includes a signal processing unit 304 as shown in FIG. 3, data obtained in the sensor node 301 is transmitted to the sink/gateway 305 via multiple hops (i.e., while passing through multiple nodes) without being subjected to additional processes and then processed through a centralized-processing in the sink/gateway 305. In this case, data transmission of a large amount of sensing information or duplicated data transmission thereof occurs in the sensor network, thereby causing high network traffic within the sensor network and increasing power consumption. Consequently, a lifetime of the sensor network is shortened.

Research has been conducted to develop methods to supplement the aforementioned defect of the centralized-processing system. In an effective one of the methods for reducing the necessity for the data transmission via multiple hops and duplicated data transmission, sensor nodes in a sensor network are grouped to form a number of clusters and sensing information of sensor nodes in a cluster are transmitted to a cluster head of the cluster to be subjected therein to signal processes, e.g., data aggregation, data fusion and the like, thereby increasing the lifetime of the network. For example, when a sensor node 311 includes an A/D and D/A converter 312 and a sensor 313 and a cluster head 316 is provided with a signal processing unit 314 as shown in FIG. 4, an excessive amount of data transmission or duplicated data transmission toward the sink/gateway 315 can be reduced, thereby reducing the total power consumption of the entire network. Another effective method will be described with reference to FIG. 5. When each sensor node 321 includes an A/D and D/A converter 322, a sensor 323 and a signal processing unit 324 as shown in FIG. 5, sensing signals of the sensor network are processed through a fully distributed-processing. Accordingly, traffic toward a sink/gateway 325, i.e., traffic in the network, can be further lowered compared to the case using the cluster head 316 as shown in FIG. 4.

However, even with the above described groupwise or fully distributed-processing method, a sensor network configuration capable of working for a longer period of time with lower power consumption and processing high-accuracy information is still required.

DISCLOSURE OF INVENTION

Technical Problem

In view of the above, the present invention provides a sensor node of wireless sensor networks and an operating method thereof, wherein the sensor node is configured to detect an occurrence of a specific event using a sensor node module with low power consumption and monitor high-accuracy information using another sensor node module having high performance after detecting the event.

Technical Solution

In accordance with an aspect of the present invention, there is provided a sensor node of a wireless sensor network, including: a first sensor node module for generating and processing, when it is activated, a first sensing signal to detect occurrence of an event based on the first sensing signal; and a second sensor node module for generating and processing a second sensing signal, when it is activated, to monitor state transition of the event based on the second sensing signal, wherein, when the occurrence of the event is detected, the first sensor node module is inactivated and the second sensor node module is activated.

In accordance with another aspect of the present invention, there is provided an operating method of a sensor node of a wireless sensor network, the sensor node operating in a first or a second operation mode, the operating method comprising: setting the operation mode of the sensor node to the first operation mode; generating and processing, if the sensor node is in the first operation mode, a first sensing signal; detecting, if the sensor node is in the first operation mode, occurrence of an event based on the first sensing signal; changing, if the occurrence of the event is detected, the operation mode to the second operation mode; and generating and processing, if the sensor node is in the second operation mode, a second sensing signal; and monitoring, if the sensor node is in the second operation mode, state transition of the event based on the second sensing signal.

Advantageous Effects

In accordance with the present invention, in the wireless sensor network operated with a limited battery power, the sensor node detects the occurrence of the specific event by using a sensor node module with low power consumption. After detecting the event, the sensor node obtains the high-accuracy information by using another sensor node module having high performance. Therefore, the conditions around the sensor node can be recognized more accurately and properly such that the occurrence and the state transition of the event can be monitored more minutely.

BRIEF DESCRIPTION OF THE DRAWINGS

The above and other objects and features of the present invention will become apparent from the following description of an embodiment given in conjunction with the accompanying drawings, in which:

FIG. 1 illustrates a configuration view of conventional wireless sensor networks;

FIG. 2 illustrates a detailed configuration view of a sensor node shown in FIG. 1;

FIG. 3 illustrates a configuration view of a conventional sensor network in which sensing signal processing is performed through a centralized-processing;

FIG. 4 illustrates a configuration view of a sensor network in which sensing signal processing is performed through a groupwise distributed-processing;

FIG. 5 illustrates a configuration view of a sensor network in which sensing signal processing is performed through a fully distributed-processing;

FIG. 6 illustrates a detailed configuration view of a sensor node in accordance with an embodiment of the present invention; and FIG. 7 illustrates a flow chart for explaining an operating method of the sensor node in accordance with the embodiment of the present invention.

BEST MODE FOR CARRYING OUT THE INVENTION

Hereinafter, an embodiment of the present invention will be described in detail with reference to the accompanying drawings, which form a part hereof.

FIG. 6 illustrates a detailed configuration view of a sensor node 400 in accordance with an embodiment of the present invention.

As shown in FIG. 6, the sensor node 400 includes a low power consumption sensor node module 410 for detecting, when it is activated, an occurrence of an event with low power consumption; and a high performance sensor node module 420, to be activated after detecting the occurrence of the event, for performing a high-performance sensing signal processing.

The low power consumption sensor node module 410, which can detect an occurrence of an event with low power consumption, includes a power supply source 411 for supplying driving power to the low power consumption sensor node module 410; a program storage unit 412 for storing therein operating programs and the like; a wireless communications unit 414 for performing wireless communications with the sensor network; a control unit 415 for controlling the overall operation of the low power consumption sensor node module 410; a sensing unit 416 for generating sensing information; and a signal processing unit 413 for processing the sensing information.

The high performance sensor node module 420, which consumes more power than the low power consumption sensor node module 410 but can process high-accuracy sensing information, includes a control unit 421 for controlling the overall operation of the high performance sensor node module 420; a sensing unit 422 for generating high-accuracy sensing information; a signal processing unit 423 for processing the high-accuracy sensing information; and a power supply source 424 for supplying driving power to the high performance sensor node module 420. Further, the sensor node 400 has an interface 430 between the control unit 415 and the control unit 421.

After detecting the occurrence of the event, the control unit 415 hands over control of the wireless communications unit 414 to the control unit 421 of the high performance sensor node module 420 via the interface 430, and turns off the rest components of the low power consumption sensor node module 410. Subsequently, the high performance sensor node module 420 transmits to the wireless communications unit 414 high-accuracy sensing information via the interface 430. The wireless communications unit 414 wirelessly transmits the high-accuracy sensing information received from the high performance sensor node module 420, which is different information from the low power consumption sensor node module 410, to a management server of the wireless sensor network via other sensor nodes and a sink thereof. If necessary, the sensor node 400 may further have an interface 431 between the wireless communications unit 414 and the control unit 421, and in such case, the high performance sensor node module 420 may be designed to independently use the wireless communications unit 414 via the interface 431.

The transmission of the sensing information continues until the event becomes invalidated. When the event is invalidated, the low power consumption sensor node module 410 is activated whereas the high performance sensor node module 420 is inactivated. Therefore, the sensor network works in a low power consumption mode again.

FIG. 7 illustrates a flow chart for explaining an operating method of the sensor node in accordance with the embodiment of the present invention. Procedures for operating the sensor node of the wireless sensor network will be described below with reference to FIGS. 6 and 7.

First, while the low power consumption sensor node module 410 is activated and the high performance sensor node module 420 is inactivated, the power supply source 411 supplies the driving power to the low power consumption sensor node module 410. The control unit 415 is operated by the operating programs stored in the program storage unit 412 and the sensing unit 416 generates, based on sensing result thereof and under the control of the control unit 415, a sensing signal for use in determining whether the event occurs or not (step S501).

The sensing signal generated by the sensing unit 416 is sent to the signal processing unit 413. The signal processing unit 413 processes, under the control of the control unit 415, the sensing signal in a low power consumption mode, i.e., with a power lower than that to be consumed when the high performance sensor node module 420 performs signal processing (step S502).

The signal processing unit 413 compares a process result, which is, e.g., numerical values representing current state of sensing target, with a specific threshold, which is, e.g., numerical values representing boundary conditions of a state where the event does not occur in the sensing target (hereinafter, referred to as a "normal state") (step S503). When the process result is within the threshold, the signal processing unit 413 determines that the current state is the normal state. When the process result exceeds the threshold, the signal processing unit 413 determines that the event occurs.

When it is determined that the current state is the normal state, a message to notify that the current state is the normal state (hereinafter, referred to as a "normal state message") is transmitted to the sensor network via the wireless communications unit 414 (step S504), and then the step S501 is again performed.

As described above, in order to detect the occurrence of the event, the low power consumption sensor node module 410 continues generating and processing the sensing signal in the low power consumption mode.

When it is determined that the event occurs in the step S503, a message to notify that the event occurs (hereinafter, referred to as a "event occurrence message") is transmitted to the sensor network via the wireless communications unit 414 (step S505). After that, the high performance sensor node module 420 is activated (step S506) and the low power consumption sensor node module 410 is inactivated (step S507). As such, the control unit 415 hands over control of the wireless communications unit 414 to the control unit 421 of the high performance sensor node module 420 via the interface 430, and turns off the rest components of the low power consumption sensor node module 410.

The activated high performance sensor node module 420 receives messages from a sink or a gateway of the sensor network via the wireless communications unit 414 (step S508). Thereafter, the high performance sensor node module 420 determines, based on the received messages, whether the event whose occurrence has been detected by the low power consumption sensor node module 410 continues (step S509).

When it is determined in the step S509 that the event terminates, the low power consumption sensor node module 410 is again activated (step S513) and the high performance sensor node module 420 is again inactivated (step S514). As such, the sensor node 400 returns to the low power consumption mode and, then the step S501 is again performed.

Meanwhile, when it is determined in the step 509 that the event continues, a sensing unit 422 generates, based on the sensing result thereof, the high-accuracy sensing signal under the control of the control unit 421, the high-accuracy sensing signal for use in monitoring state transition of the event accurately (step S510).

The signal processing unit 423 performs a high-performance signal processing on the high-accuracy sensing signal generated by the sensing unit 422 and generates a sensor message based on the process result under the control of the control unit 421 (step S511). The sensor message is transmitted to the sensor network via the wireless communications unit 414 (step S512).

In the above-described embodiment, the high performance sensor node module 420 processes more accurate and larger amount of data than that processed by the low power consumption sensor node module 410. However, the high performance sensor node module 420 may be designed to process different type of sensing information from that processed by the low power consumption sensor node module 410.

While the invention has been shown and described with respect to the embodiment, it will be understood by those skilled in the art that various changes and modifications may be made without departing from the scope of the invention as defined in the following claims.

The invention claimed is:

1. A sensor node of a wireless sensor network, comprising:
   a first sensor node module for generating and processing, when it is activated, a first sensing signal to detect occurrence of an event based on the first sensing signal; and
   a second sensor node module for generating and processing a second sensing signal, when it is activated, to monitor state transition of the event based on the second sensing signal,
   wherein, when the occurrence of the event is detected, the first sensor node module is inactivated and the second sensor node module is activated.

2. The sensor node of claim 1, wherein power consumption of the first sensor node module is lower than that of the second sensor node module.

3. The sensor node of claim 1, wherein the amount of the second sensing signal is larger than that of the first sensing signal.

4. The sensor node of claim 1, wherein the second sensing signal has more accurate information than that of the first sensing signal.

5. The sensor node of claim 1, wherein the first sensing signal and the second sensing signal have types of information different from each other.

6. The sensor node of claim 5, wherein the second sensor node module includes:
   a second power supply source for supplying driving power to the second sensor node module;
   a second control unit for controlling overall operation of the second sensor node module;
   a second sensing unit for generating the second sensing signal; and
   a signal processing unit for processing the second sensing signal.

7. The sensor node of claim 1, wherein the first sensor node module includes:
   a first power supply source for supplying driving power to the first sensor node module;
   a program storage unit for storing therein operating programs of the first sensor node module;
   a first control unit for controlling overall operation of the first sensor node module;
   a first sensing unit for generating the first sensing signal;
   a first signal processing unit for processing the first sensing signal; and
   a wireless communications unit for transmitting messages to the wireless sensor network.

8. An operating method of a sensor node of a wireless sensor network, the sensor node operating in a first or a second operation mode, the operating method comprising:
   setting the operation mode of the sensor node to the first operation mode;
   generating and processing, if the sensor node is in the first operation mode, a first sensing signal;
   detecting, if the sensor node is in the first operation mode, occurrence of an event based on the first sensing signal;
   changing, if the occurrence of the event is detected, the operation mode to the second operation mode; and
   generating and processing, if the sensor node is in the second operation mode, a second sensing signal; and
   monitoring, if the sensor node is in the second operation mode, state transition of the event based on the second sensing signal.

9. The method of claim 8, wherein power consumption of the sensor node in the first operation mode is lower power than that of the sensor node in the second operation mode.

10. The method of claim 8, wherein the amount of the second sensing signal is larger than that of the first sensing signal.

11. The method of claim 8, wherein the second sensing signal has more accurate information than that of the first sensing signal.

12. The method of claim 8, wherein the first sensing signal and the second sensing signal have types of information different from each other.

* * * * *